Oct. 1, 1968

C. K. STINE ET AL 3,403,943

OUTLET STRUCTURE FOR UNLOADING BULK MATERIALS EITHER BY GRAVITY OR PNEUMATICALLY

Filed Sept. 11, 1967

INVENTORS.

CLAIR K. STINE
RICHARD H. DUGGE

BY Eugene N. Riddle

ATTORNEY

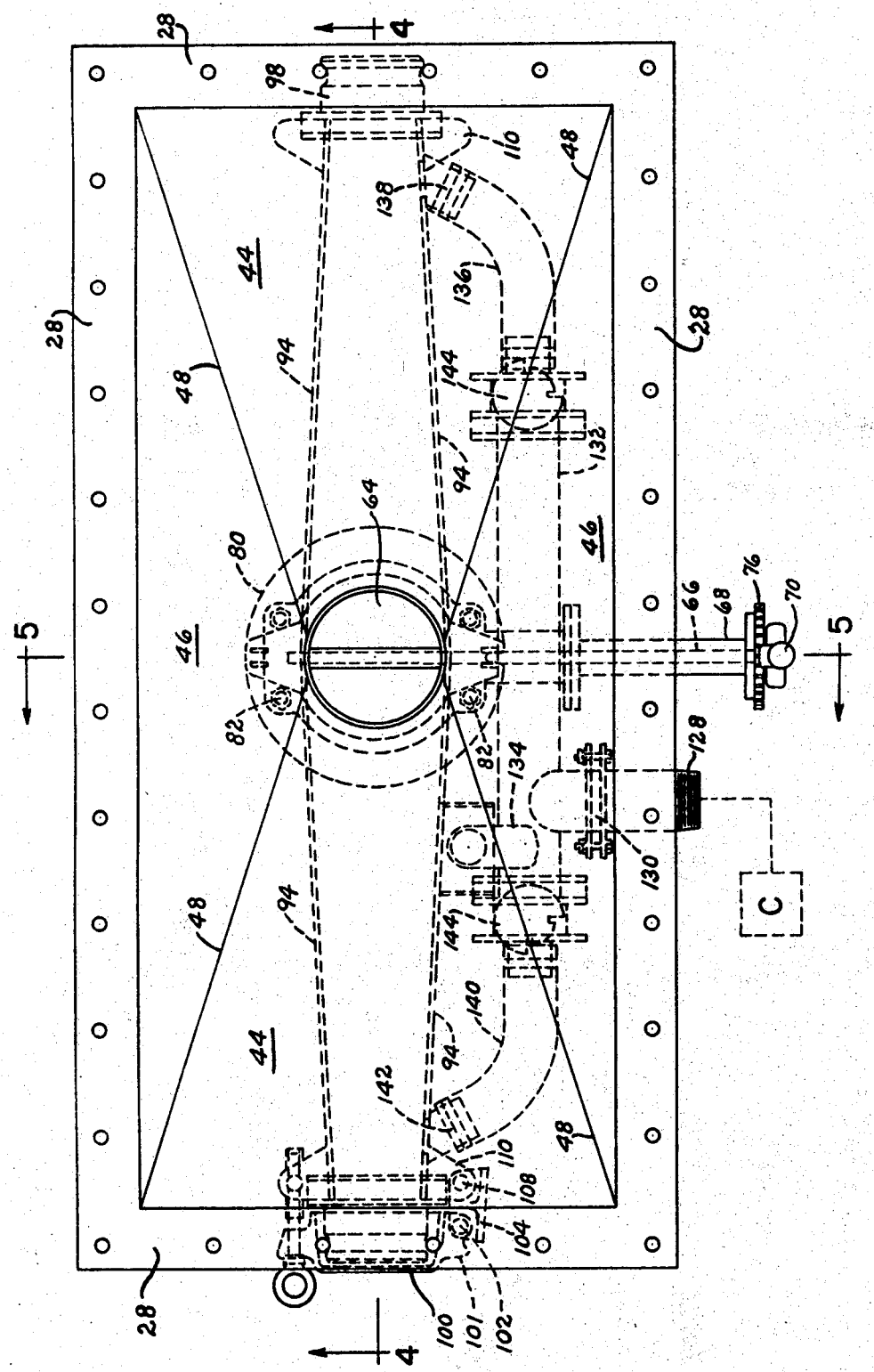

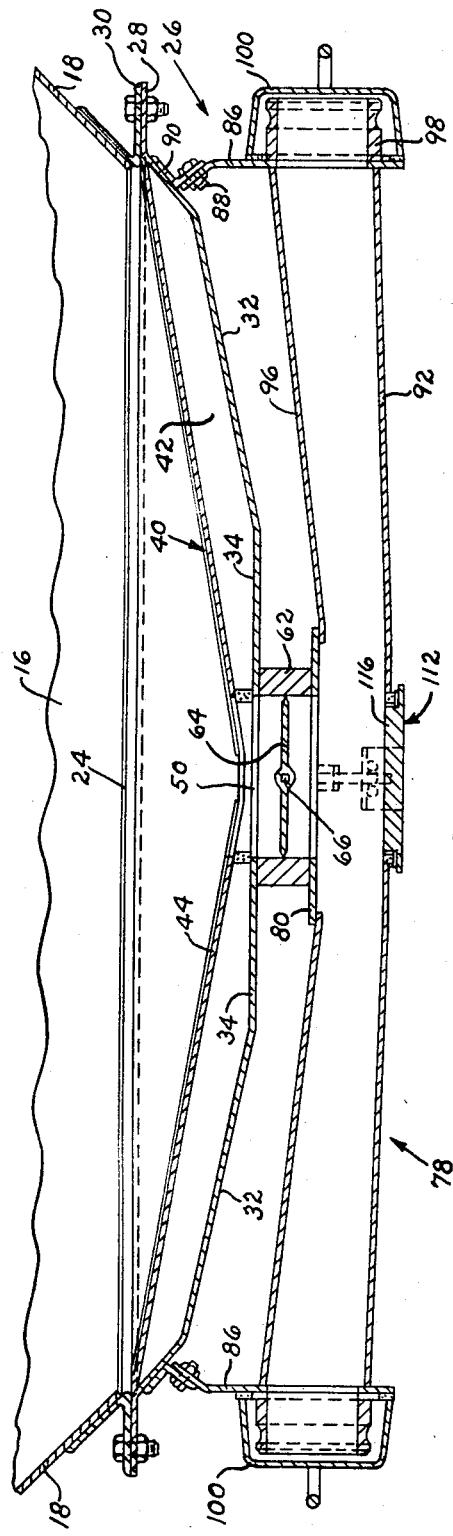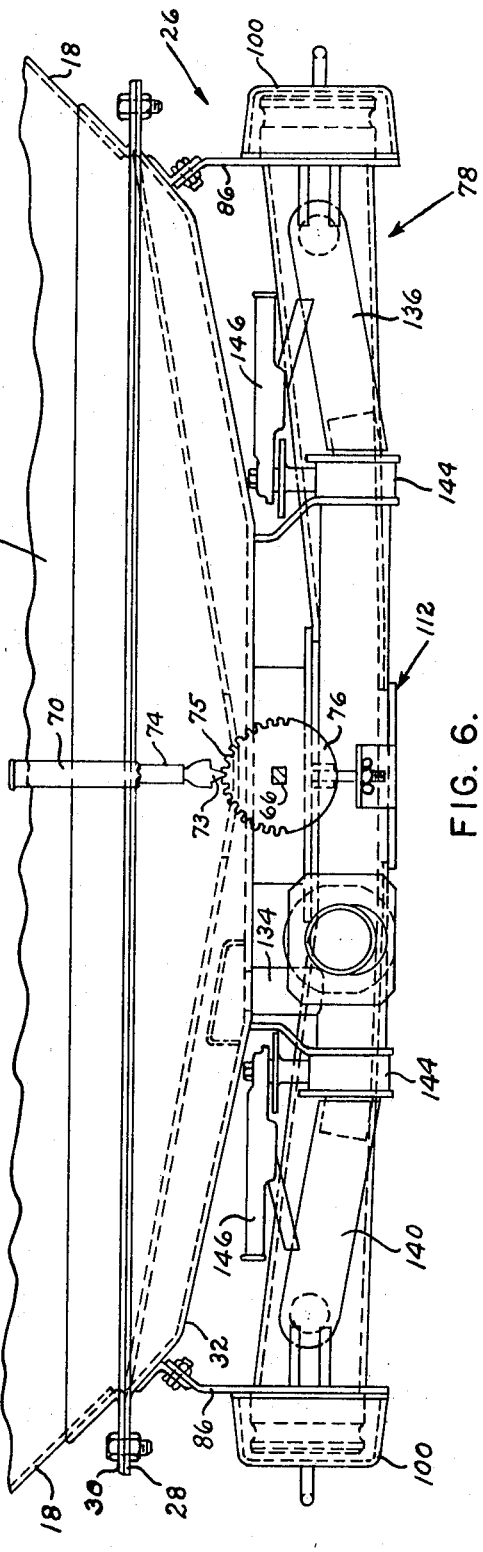

United States Patent Office 3,403,943
Patented Oct. 1, 1968

3,403,943
OUTLET STRUCTURE FOR UNLOADING BULK MATERIALS EITHER BY GRAVITY OR PNEUMATICALLY
Clair K. Stine, O'Fallon, and Richard H. Dugge, St. Louis County, Mo., assignors to ACF Industries, Incorporated, New York, N.Y., a corporation of New Jersey
Filed Sept. 11, 1967, Ser. No. 666,679
7 Claims. (Cl. 302—52)

ABSTRACT OF THE DISCLOSURE

An outlet structure mounted beneath a hopper of a covered hopper railway car to discharge particulate material selectively either by gravity or pneumatically. A butterfly valve is mounted in a tubular discharge conduit to control the flow of particulate material from the hopper and a removable elongate pneumatic discharge conduit is mounted beneath the butterfly valve for discharging the particulate material pneumatically. A removable lower cover forms a portion of the bottom of the pneumatic conduit and is positioned in vertical axial alignment with the butterfly valve to permit gravity unloading upon opening of the butterfly valve when the lower cover is removed.

---

As shown in copending application Ser. No. 545,078, filed Aug. 25, 1966, entitled, "Apparatus for Fluidizing Bulk Materials," and in U.S. Patent No. 3,322,469, issued May 30, 1967, butterfly valves have been employed to control the flow of lading and the like from outlet structures. Butterfly valves may easily be made air-tight which particularly adapts butterfly valves for use in pressurized hoppers or covered hopper railway cars.

The present invention is directed to an elongate pneumatic discharge conduit positioned beneath a butterfly valve and having a removable lower cover forming a portion of the bottom of the pneumatic conduit and positioned vertically beneath the butterfly valve for gravity unloading upon removal of the cover and opening of the butterfly valve. The butterfly valve controls the flow of lading into the pneumatic conduit for pneumatic unloading and when closed is tightly sealed against a suitable gasket to maintain an air-tight relation. The bottom outlet structure may be provided with a plenum chamber to aerate the lading being unloaded and to pressurize the interior of the covered hopper railway car, if desired, to assist in the unloading of the lading. The elongate pneumatic discharge conduit extends outwardly from opposed sides of the butterfly valve and permits selective pneumatic unloading from either side of the car.

The invention accordingly comprises the constructions hereinafter described, the scope of the invention being indicated in the following claims.

In the accompanying drawings, in which one of various possible embodiments of the invention is illustrated:

FIGURE 2 is an enlarged top plan of a bottom outlet structure shown in FIGURE 1 removed from the railway car;

FIGURE 4 is a longitudinal section taken generally along line 4—4 of FIGURE 2;

FIGURE 6 is a side elevation of the bottom outlet structure of FIGURES 2–5;

Corresponding reference characters indicate corresponding parts throughout the several views of the drawing.

Figure 1:
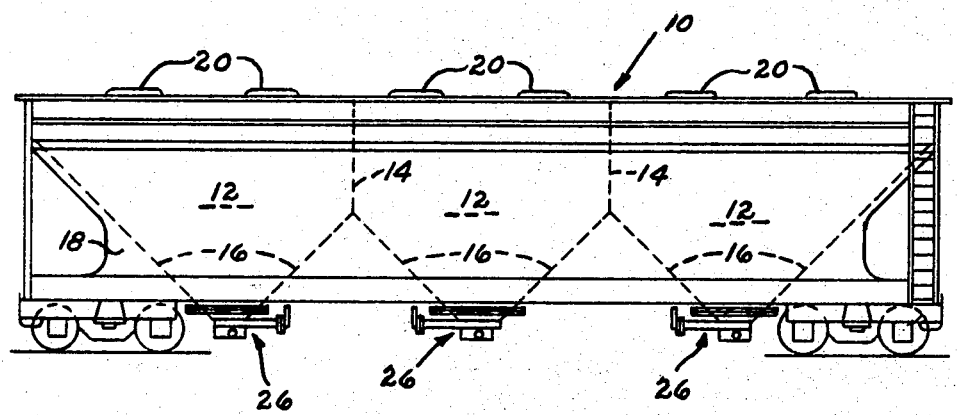
FIGURE 1 is a side elevation of a covered hopper railway car having a plurality of bottom outlet structures comprising the present invention mounted thereon.

Referring now to the drawings for a better understanding of the invention and more particularly to FIGURE 1, a covered hopper railway car is generally indicated 10 having a plurality of hoppers 12 separated by partitions 14. Hopper slope sheets 16 extend between side sheets 18 and hatch covers 20 provide for loading of hoppers 12. Slope sheets 16 and side sheets 18 funnel downwardly to a lower hopper opening 24 for each hopper 12.

Mounted beneath each hopper 12 is a bottom outlet structure generally indicated 26. Each bottom outlet structure 26 has an upper peripheral flange 28 secured by suitable securing means, such as nut and bolt combinations, to adjacent peripheral flange 30 about hopper opening 24. Each bottom outlet structure 26 includes outlet sides or walls 32 having lower generally horizontal portions 34 and outlet ends or walls 36 having lower horizontal portions 38. Horizontal portions 34 and 38 form a generally flat bottom.

Secured to the upper edge of peripheral flange 28 is a fluid permeable load bearing member generally indicated 40 and forming a plenum chamber 42 with outlet ends 32 and outlet sides 36. Fluid permeable load bearing member 40 includes end sections 44 over outlet ends 32 and side sections 46 over sides 36. Permeable sections 44 are positioned at a relatively small slope while permeable sections 46 are positioned at a greater slope. Sections 44 and 46 are joined to each other along lines 48 and form plenum chamber 42 about the entire periphery of a bottom outlet discharge opening 50.

Figure 9:
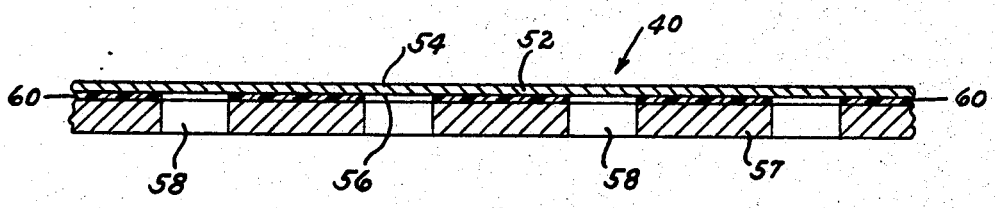
FIGURE 9 is a section taken generally along line 9—9 of FIGURE 8 and illustrating the fluid permeable member mounted within the bottom outlet structure to form the plenum chamber.
Figure 3:
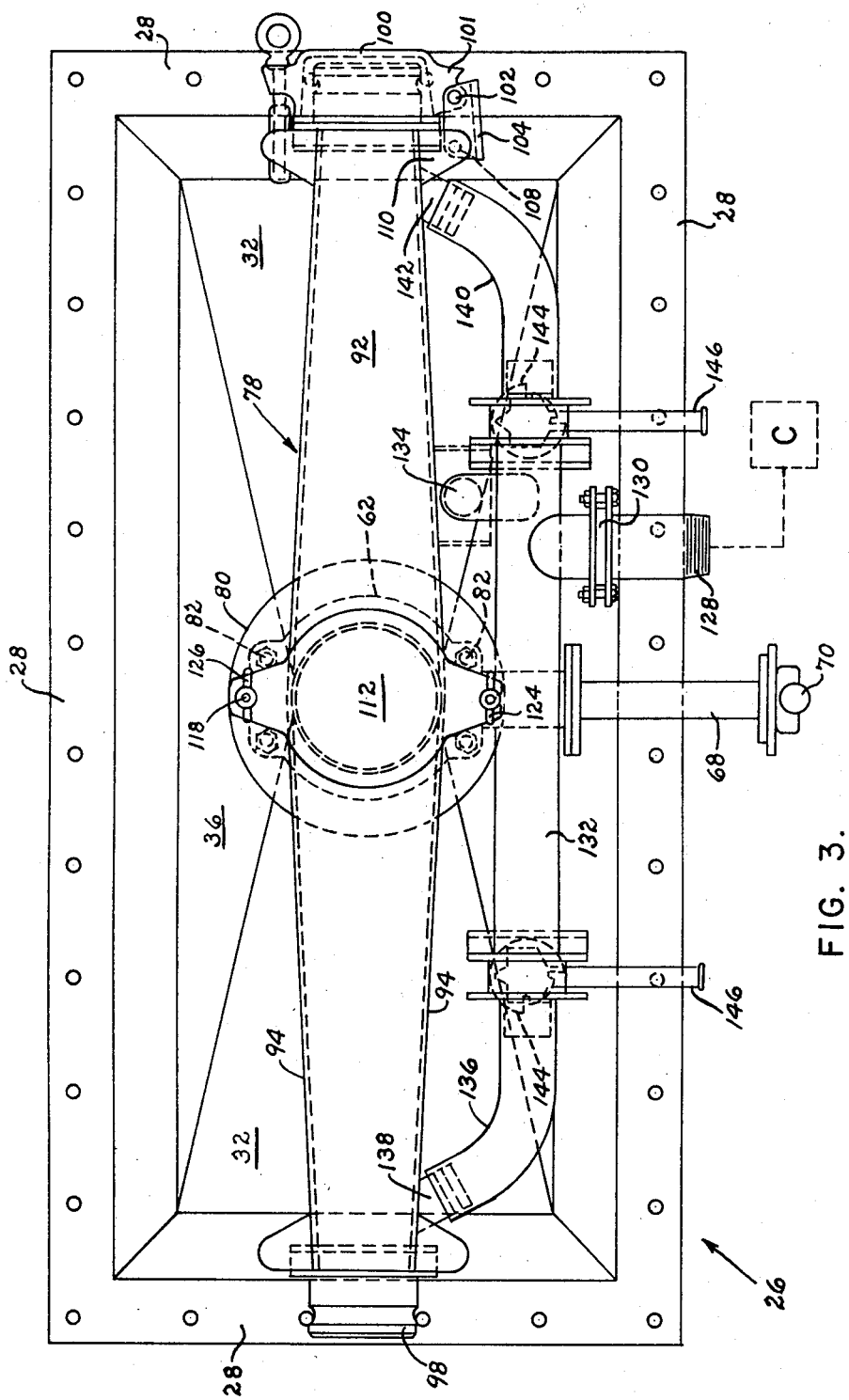
FIGURE 3 is an enlarged bottom plan of the outlet structure shown in FIGURE 2.

Referring particularly to FIGURE 9, fluid permeable member 40 includes an upper permeable sheet 52 having generally parallel faces 54 and 56. Upper face 54 forms a material supporting surface, the material to be unloaded moving therealong to opening 50 for discharge. Permeable sheet 52 is formed of a fiber metal material in which metallic fibers, such as stainless steel fibers, are individually dispersed and felted to form a random, interlocked nonwoven body which is sintered under reducing conditions at a high temperature to produce welds at interfiber contact points. A suitable material for sheet 52 is manufactured and sold under the name "Feltmetal" by Huyck Metals Division of Huyck Corporation, 45 Woodmont Road, Milford, Conn.

As permeable member 40 has a relatively large unsupported dimension between walls 32 and 36, the weight of the material or lading supported thereon forms a substantial dead load on permeable member 40 during transit. A rigid perforated plate or base 57 is secured to sheet 52 and is generally coextensive with sheet 52. Perforations 58 extend through plate 57 and may comprise around sixty percent (60%) of the entire surface area of the plate. To secure sheet 52 to plate 57, a layer of thermo-active adhesive 60 is first smeared on a face of plate 57 and sheet 52 is then pressed into contact with plate 57. An adhesive which has been found to be satisfactory for bonding sheet 52 to plate 57 is adhesive EC–2214 produced by Minnesota Mining and Manufacturing Company, Adhesives, Coatings, and Sealers Division, 900 Bush Ave., St. Paul 6, Minn.

A permeability of around ten (10) for permeable member 40 has been found to be satisfactory for handling finely-divided particles or particulate material. This rating may be obtained by employing a metallic sheet 52 of around one-sixteenth (1/16) inch in thickness and a steel plate 57 of around one-eighth (1/8) inch in thickness with apertures or openings 58 comprising around sixty percent (60%) of the entire surface area. For further details of permeable member 40, reference is made to Patent No. 3,237,812, issued Mar. 1, 1966 to W. E. Kemp and entitled "Apparatus for Handling Bulk Materials," the entire disclosure of which is incorporated by this reference.

Positioned beneath outlet discharge opening 50 is a valve housing 62 carrying a butterfly valve 64 which is mounted on a shaft 66. Shaft 66 extends within an outer sleeve 68 outwardly from butterfly valve 64 to a handle 70 which may be easily gripped by an operator. A lever 72 is pivoted at 71 to handle 70 and has a detent 73 on its lower end. A spring clip 74 between lever 72 and handle 70 urges detent 73 laterally into engagement with a selected one of a plurality of notches 75 on a disk 76. Gripping of lever 72 withdraws detent 73 from an associated notch 75 to permit rotation of valve 64 to a predetermined position with relation to discharge opening 50. Upon release of lever 72, detent 73 under bias of spring 74 will engage an adjacent notch 75 to prevent rotation of valve 64.

Mounted beneath valve housing 62 is an elongate pneumatic conduit generally indicated 78 and having an upper annular flange 80 extending circumferentially about housing 62. Bolts 82 extend from the bottom of outlet structure 26 through housing 62 and annular flange 80 for mounting pneumatic conduit 78 beneath valve housing 62. Nuts 84 secure pneumatic conduit 78 to valve housing 62. Adjacent each end of pneumatic conduit 78 is an upwardly extending strap 86 secured by a suitable nut and bolt combination 88 to angle supports 90 welded to the outer surface of outlet ends 32 as shown in FIGURE 4.

The pneumatic conduit 78 is generally box-shaped and including a generally horizontal bottom wall 92 and vertical side wall 94. An upper wall 96 slopes upwardly from flange 80 to the ends of pneumatic conduit 78. A suitable circular fitting 98 adjacent each end of outlet conduit 78 is adapted to receive a removable cap 100 thereon forming a closure. Cap 100 has a lug 101 pivoted at 102 to hinge 104. Hinge 104 is pivotally connected at 108 to lug 110 on adjacent side wall 94.

Figure 5:
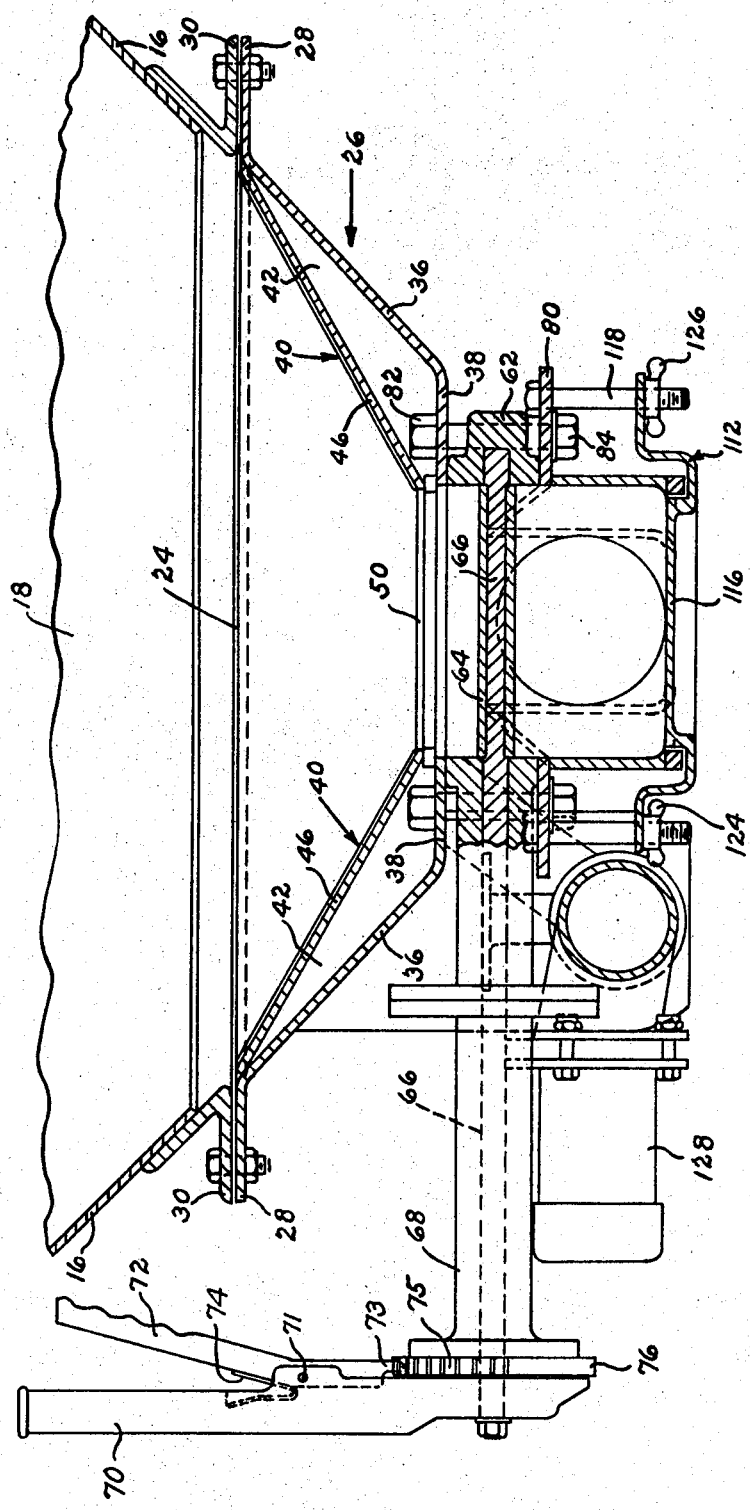
FIGURE 5 is a transverse section taken generally along line 5—5 of FIGURE 2.
Figure 7:
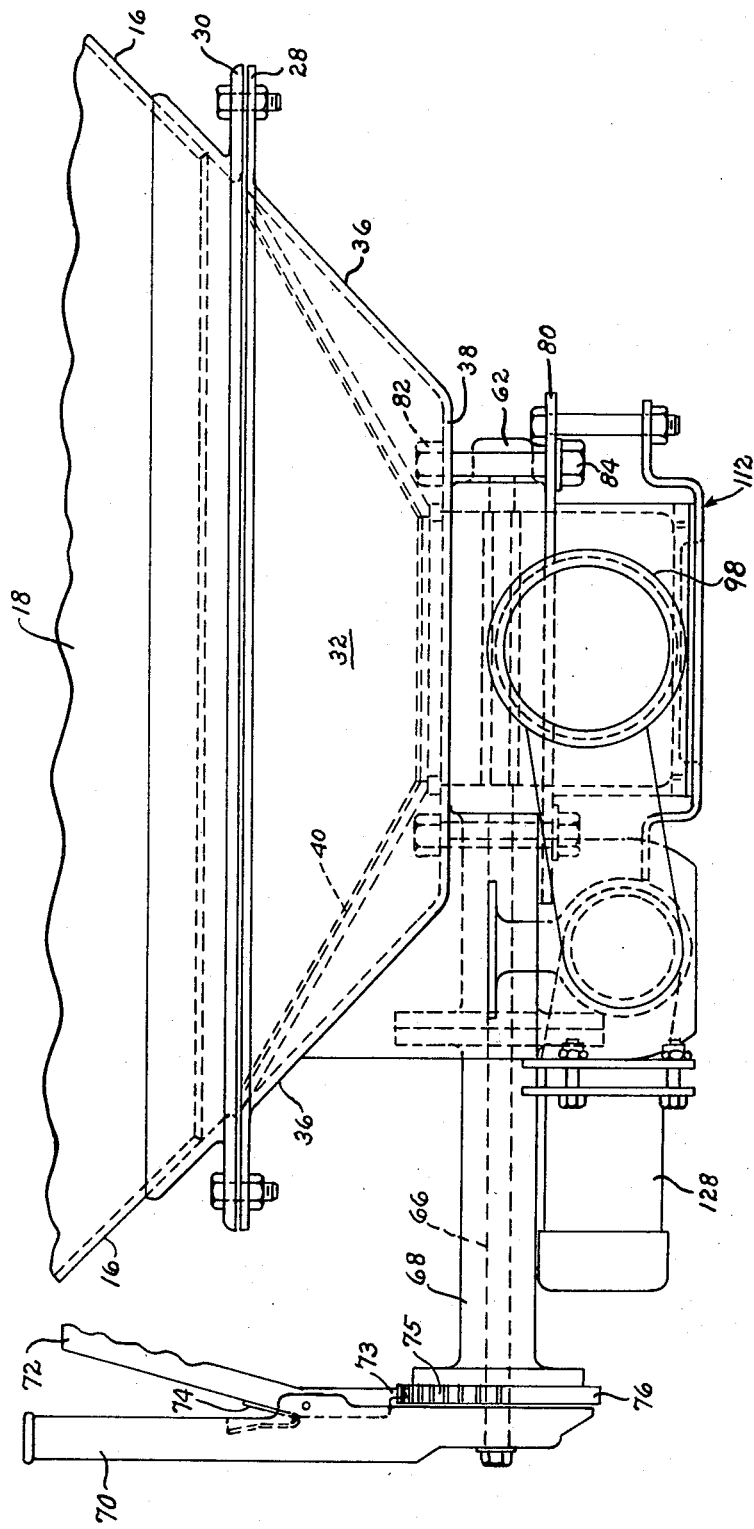
FIGURE 7 is an end elevation of the bottom outlet structure of FIGURES 2–5.
Figure 8:
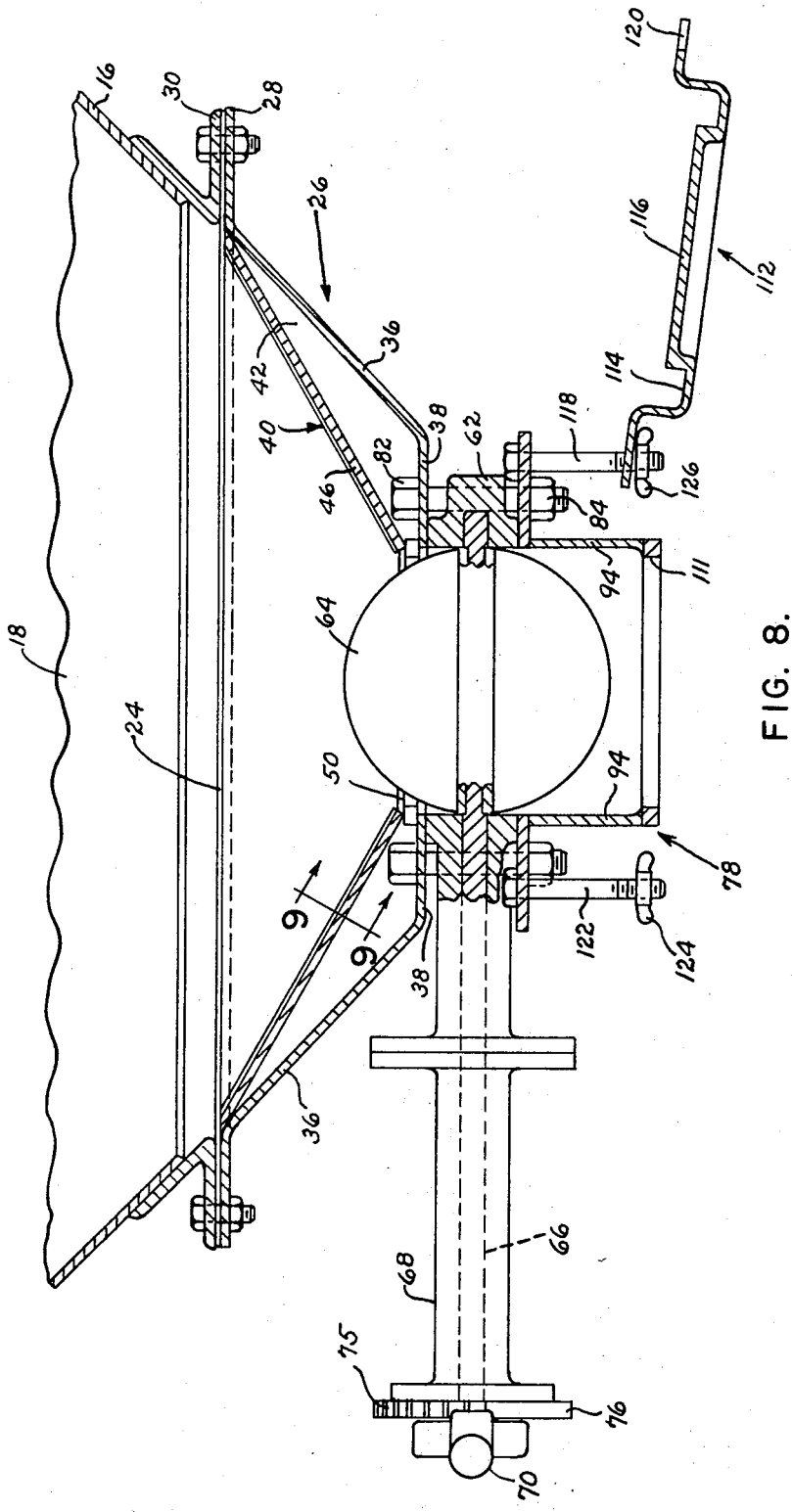
FIGURE 8 is a section similar to FIGURE 5 but illustrating the lower cover in open position for gravity unloading.

Referring particularly to FIGURES 5 and 8, pneumatic conduit 78 has an opening III in bottom wall 92 positioned beneath butterfly valve 64. A removable lower cover 112 has an inner circumferential groove 114 which defines a raised inner ledge 116 fitting within opening 111. Ledge 116 forms a portion of bottom 92 and a relatively smooth continuaiton of the inner surface of bottom 92 as shown in FIGURE 4. Cover 112 is pivotally mounted on bolt 118 supported on annular flange 80. A suitable slot 120 in an edge of cover 112 receives bolt 122 mounted on flange 80 opposite bolt 118. Wing nuts 124 and 126 may be loosened for permitting pivoting of cover 112 about bolt 118 to open position as shown in FIGURE 8 to permit a gravity discharge of lading.

Referring to FIGURE 5, for gravity unloading, with cover 112 closed and butterfly valve 64 closed as shown in FIGURE 5, wing nuts 124 and 126 are loosened and cover 112 is swung to the position of FIGURE 8. Handle 70 and lever 72 are gripped manually and lever 72 is pressed inwardly toward handle 70 to remove detent 73 from an associated notch 75 to permit rotation of butterfly valve 64 to the desired opening. The lading is then discharged from gravity through opening 50.

For pressurizing the interior of hopper car 10 and aerating the particulate material being unloadd, an air compressor C supplies air to air inlet line 128. A check valve 130 in line 128 prevents back flow of air. Air inlet 128 leads to main pipe 132 and a branch inlet pipe 134 leads from pipe 132 to plenum chamber 42 to aerate the particles being unloaded and to pressurize the interior of the car to around 5 p.s.i. (pounds per square inch). A suitable safety valve (not shown) may be provided to limit the internal pressure of the railway car to five (5) p.s.i. A flexible connection 136 extends from one end of main pipe 132 to a fitting 138 adjacent one end of conduit 78. A flexible connection 140 extends from the other end of main pipe 132 to a fitting 142 on the opposite end of pneumatic conduit 78. Control valves 144 at the ends of main pipe 132 may be actuated by handles 146 in a manner similar to main butterfly valve 64 to control, selectively, the flow of air through connections 136 and 140 to an associated end of pneumatic conduit 78 for unloading lading from a selected side of the railway car.

For pneumatic unloading from a selected side of the covered hopper railway car 10, air is supplied to the interior of the car from air inlet 128 to pressurize the interior of the car to around 5 p.s.i. through plenum chamber 42 and permeable member 40. Then, cap 100 is removed from the desired side of the car and a suitable vacuum hose or the like is connected to the associated fitting 98. For example, referring to FIGURE 2, cap 100 as viewed on the left side of pneumatic conduit 78 is opened and associated valve 144 for flexible connection 140 is opened to supply air through the connecting unloading hose to create a vacuum. Then, butterfly valve 64 may be opened by actuation of handle 70 to provide a flow of lading into pneumatic conduit 78 for discharge. The material adjacent permeable membrane 40 is aerated or fluidized to assist in the movement of the particulate material to bottom discharge opening 50 for unloading. The aerating of the particulate material being unloaded is particularly desirable when the slopes of the sides of hopper outlet structure 26 are relatively small.

Thus, bottom outlet structure 78 may be unloaded either by gravity or pneumatically and utilizes a butterfly valve 64 to control the flow of lading for both gravity and pneumatic unloadings. Bottom cover 112 is positioned directly below valve 64 and forms a portion of the bottom of pneumatic conduit 78.

In view of the above, it will be seen that the several objects of the invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A bottom outlet structure adapted to be mounted beneath a hopper for unloading particulate material selectively either by gravity or pneumatically, said bottom outlet structure comprising a plurality of connected walls funneling downwardly to a discharge opening, a valve housing beneath said discharge opening, a butterfly valve mounted within said housing closely adjacent said discharge opening and movable between open and closed positions to control the discharge of particulate material from the hopper, an elongate pneumatic conduit secured beneath said valve housing and extending generally in a horizontal direction from opposite sides thereof, means adjacent each end of said elongate pneumatic conduit adapted to permit attachment of pneumatic unloading means thereto for unloading pneumatically from opposite sides of said outlet structure, and a removable cover on said elongate conduit in vertical axial alignment with said butterfly valve to permit gravity unloading when said cover is removed and said butterfly valve is opened.

2. A bottom outlet structure as set forth in claim 1 wherein a fluid permeable load bearing member is mounted over and spaced from at least some of said connected walls to form a plenum chamber therebetween, and means to supply air to said plenum chamber to permit aerating any particulate material adjacent said fluid permeable load bearing member.

3. A bottom outlet structure as set forth in claim 1 wherein said cover on said pneumatic conduit forms a portion of the bottom of said pneumatic conduit and is positioned generally centrally of the length of said elongate pneumatic conduit.

4. A bottom outlet structure as set forth in claim 1 wherein an air supply conduit has connecting portions secured to and communicating with said pneumatic conduit on each side of said butterfly valve, and valve means is positioned in each of said connecting portions movable between open and closed positions to supply air for pneumatically unloading particulate material from a selected end of said pneumatic conduit.

5. A bottom outlet structure adapted to be mounted beneath a hopper for unloading particulate material selectively either by gravity or pneumatically, said bottom outlet structure comprising a plurality of connected walls funneling downwardly to a discharge opening, a generally cylindrical valve housing defining said discharge opening and extending axially in a vertical direction, a butterfly valve mounted within said valve housing, means to selectively move said butterfly valve between open and closed positions to control the discharge of particulate material from said hopper, an elongate pneumatic conduit secured beneath said valve housing and extending generally in a horizontal direction therefrom, a removable closure on an extending end of said elongate pneumatic conduit and adapted upon removal thereof to permit attachment of pneumatic unloading means thereto for unloading pneumatically, and a removable cover forming a portion of the bottom of said elongate pneumatic conduit and positioned in vertical axial alignment with said butterfly valve to permit gravity unloading when said cover is removed and said butterfly valve is opened.

6. A covered hopper railway car having, a plurality of hoppers, a bottom outlet structure mounted beneath each hopper for unloading particulate material selectively either by gravity or pneumatically, each bottom outlet structure comprising a plurality of connected walls funneling downwardly to a discharge opening, a valve housing beneath said discharge opening, a butterfly valve mounted within said housing and movable between open and closed positions to control the discharge of particulate material from the associated hopper, an elongate pneumatic conduit secured beneath said valve housing and extending generally in a horizontal direction from opposite sides of the valve housing to opposite sides of the railway car, means adjacent each end of said elongate pneumatic conduit adapted to permit attachment of pneumatic unloading means thereto for selective pneumatic unloading from either side of said railway car, a removable cover on said elongate pneumatic conduit in vertical axial alignment with said butterfly valve to permit gravity unloading when said cover is removed and said butterfly valve is opened, a fluid permeable load bearing member over said connected walls forming with the walls a plenum chamber extending about the entire periphery of said discharge opening, and means to supply air to said plenum chamber to pressurize the interior of the railway car and to aerate the particulate material being discharged for assisting the pneumatic unloading thereof.

7. A covered hopper railway car as set forth in claim 6 wherein said removable cover on said pneumatic conduit forms a portion of the bottom of said pneumatic conduit and is positioned generally centrally of the length of said elongate pneumatic conduit.

References Cited
UNITED STATES PATENTS

| | | | |
|---|---|---|---|
| 2,545,766 | 3/1951 | Cline | 214—83.28 |
| 2,647,802 | 8/1953 | Hornbrook | 302—52 |
| 2,901,133 | 8/1959 | Weller | 302—52 |
| 3,138,409 | 6/1964 | Green et al. | 302—52 |
| 3,322,469 | 5/1967 | Fritz | 302—52 |

ANDRES H. NIELSEN, *Primary Examiner.*